(12) United States Patent
Kuki et al.

(10) Patent No.: US 10,532,433 B2
(45) Date of Patent: Jan. 14, 2020

(54) LASER BEAM PROFILER UNIT AND LASER PROCESSING APPARATUS

(71) Applicant: DISCO CORPORATION, Tokyo (JP)

(72) Inventors: Junichi Kuki, Tokyo (JP); Joel Koerwer, Tokyo (JP); Keinosuke Maeda, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/111,413

(22) Filed: Aug. 24, 2018

(65) Prior Publication Data

US 2019/0061063 A1 Feb. 28, 2019

(30) Foreign Application Priority Data

Aug. 25, 2017 (JP) .................. 2017-162558

(51) Int. Cl.
  *B23K 26/70* (2014.01)
  *G02B 27/28* (2006.01)
  (Continued)

(52) U.S. Cl.
  CPC ........ *B23K 26/705* (2015.10); *B23K 26/0648* (2013.01); *B23K 26/0652* (2013.01);
  (Continued)

(58) Field of Classification Search
  CPC ........... G01N 15/1459; G01N 15/1434; G01N 2015/1006; G01N 15/1436; G01N 2015/144; G01N 2015/1452; G01N 2015/1438; G01N 21/6428; G01N 2201/06113; G01N 15/0205; G01N 15/0211; G01N 15/1404; G01N 15/1456; G01N 1/10; G01N 2015/1075; G01N 2015/149; G01N 2015/1493; G01N 2015/1497; G01N 21/0303; G01N 21/552; G01N 21/553; G01N 21/6452; G01N 21/6458; G01N 21/648; G01N 2201/068;
  (Continued)

(56) References Cited

U.S. PATENT DOCUMENTS 4,660,975 A * 4/1987 Aughton ................... G01J 3/14
  356/308
5,258,821 A * 11/1993 Doggett ................ G01J 1/4257
  356/121

(Continued)

FOREIGN PATENT DOCUMENTS

JP 2010249727 A 11/2010
JP 2016041437 A 3/2016

*Primary Examiner* — Michael P Stafira
(74) *Attorney, Agent, or Firm* — Greer Burns & Crain, Ltd.

(57) ABSTRACT

A laser beam profiler unit for measuring an intensity distribution of a laser beam oscillated from a laser oscillator includes a magnifying optical system for magnifying a spot diameter of the laser beam oscillated from the laser oscillator and focused by a condensing lens, a first transmission prism for attenuating the laser beam, a second transmission prism for further attenuating a laser beam reflected by the first transmission prism, an image capturing element for detecting the laser beam reflected by the second transmission prism, and an analyzer for analyzing an intensity distribution of a spot of the laser beam from data of the laser beam detected by the image capturing element.

17 Claims, 6 Drawing Sheets

(51) Int. Cl.
*G01J 1/42* (2006.01)
*B23K 26/06* (2014.01)
*B23K 26/073* (2006.01)
*G01J 1/04* (2006.01)

(52) U.S. Cl.
CPC ........ *B23K 26/0665* (2013.01); *B23K 26/073* (2013.01); *G01J 1/0477* (2013.01); *G01J 1/4257* (2013.01); *G02B 27/281* (2013.01)

(58) Field of Classification Search
CPC .... G01N 27/745; G01N 33/04; G01N 33/543; G01N 33/54306; G01N 33/54386; G01N 15/1427; G01N 15/1429; G01N 15/1484; G01N 2015/0038; G01N 2015/0065; G01N 2015/03; G01N 2015/145; G01N 2015/1454; G01N 2021/6419; G01N 2021/6421; G01N 2021/6439; G01N 2021/6441; G01N 2035/00158; G01N 21/01; G01N 21/23; G01N 21/6408; G01N 21/85; G01N 2201/0636; G01N 2201/12; B23K 2103/50; B23K 26/0624; B23K 26/53; B23K 26/40; B23K 2103/52; B23K 2103/54; B23K 26/0006; B23K 26/0626; B23K 26/0648; B23K 26/082; B23K 2101/40; B23K 2103/42; B23K 2103/56; B23K 26/032; B23K 26/0622; B23K 26/0643; B23K 26/0652; B23K 26/0665; B23K 26/067; B23K 26/0734; B23K 26/0738; B23K 26/08; B23K 26/16; B23K 26/364; B23K 26/38; B23K 2103/10; B23K 2103/172; B23K 26/043; B23K 26/0608; B23K 26/0736; B23K 26/0876; B23K 26/103; B23K 26/12; B23K 26/123; B23K 26/128; B23K 26/34; B23K 26/342; B23K 26/361; B23K 26/382; B23K 26/402; B23K 2101/38; B23K 2103/08; B23K 2103/12; B23K 2103/14; B23K 26/0093; B23K 26/03; B23K 26/034; B23K 26/04; B23K 26/06; B23K 26/0613; B23K 26/0617; B23K 26/064; B23K 26/066; B23K 26/073; B23K 26/0732; B23K 26/0823; B23K 26/0884; B23K 26/10; B23K 26/127; B23K 26/142; B23K 26/144; B23K 26/1476; B23K 26/206; B23K 26/355; B23K 26/359; B23K 26/389; B23K 26/55; B23K 26/705; B23K 37/0217; B23K 37/0288; G02B 21/04; G02B 21/361; G02B 27/0025; G02B 6/26; G02B 6/29365; G02B 26/10; G02B 27/0927; G02B 17/00; G02B 2006/12104; G02B 2006/12121; G02B 27/0905; G02B 27/48; G02B 5/122; G02B 6/02042; G02B 6/03644; G02B 6/32; G02B 6/34; G02B 6/4214; G02B 19/0014; G02B 19/0057; G02B 19/0095; G02B 27/0172; G02B 5/1814; G02B 19/0028; G02B 19/0076; G02B 2027/012; G02B 2027/0178; G02B 21/002; G02B 21/0032; G02B 21/0084; G02B 21/16; G02B 26/103; G02B 26/108; G02B 26/12; G02B 26/124; G02B 26/125; G02B 26/126; G02B 27/017; G02B 27/0944; G02B 27/0966; G02B 27/14; G02B 27/225; G02B 27/281; G02B 27/283; G02B 5/3091; G02B 6/10; G02B 9/02004; G02B 9/02091; G02B 11/2513; G02B 11/2518; G02B 9/02044; G02B 11/24; G02B 11/2509; G02B 9/02045; G02B 9/02077; G02B 9/02087; G02B 11/2441; G01J 3/0278; G01J 3/2803; G01J 3/2823; G01J 3/4406; G01J 1/0477; G01J 1/4257; G01J 3/02; G01J 3/0218; G01J 3/0272; G01J 3/0291; G01J 3/28; G01J 3/44

See application file for complete search history.

(56) References Cited

U.S. PATENT DOCUMENTS

| | | | | |
|---|---|---|---|---|
| 5,951,891 | A * | 9/1999 | Barenboim | B23K 26/032 219/121.68 |
| 2003/0150997 | A1* | 8/2003 | Eckert | G01J 1/4257 250/372 |
| 2005/0215986 | A1* | 9/2005 | Chernyak | A61F 9/008 606/5 |
| 2007/0121470 | A1* | 5/2007 | Nakamura | G11B 7/1275 369/112.01 |
| 2016/0223810 | A1* | 8/2016 | Matozaki | G02B 26/10 |
| 2018/0236601 | A1* | 8/2018 | Brunton | B23K 26/0732 |

* cited by examiner

LASER BEAM PROFILER UNIT AND LASER PROCESSING APPARATUS

BACKGROUND OF THE INVENTION

Field of the Invention

The present invention relates to a laser beam profiler unit for measuring the profile of a laser beam that has been focused which is to be applied to a workpiece, and a laser processing apparatus incorporating such a laser beam profiler unit.

Description of the Related Art

Generally, there are known laser processing apparatus for applying a laser beam to a workpiece with various devices formed thereon, such as a semiconductor device wafer, to form laser-processed grooves or modified layers in the workpiece along projected dicing lines thereon. In the known laser processing apparatus, the laser beam that is used in various processing applications has its various characteristics including a spot diameter, a spot shape such as a circular shape, an elliptical shape, or the like, and a power density adjusted to optimum conditions depending on the workpiece.

Optical elements that are used in laser oscillators and optical systems tend to have their characteristics shifted gradually from adjusted optimum conditions due to aging-induced deteriorations. For this reason, there have heretofore been proposed technologies for measuring characteristics, known as profile, including a spot shape, an intensity distribution, and so on of a laser beam (see, for example, Japanese Patent Laid-open No. 2010-249727 and Japanese Patent Laid-open No. 2016-41437).

SUMMARY OF THE INVENTION

The technology disclosed in Japanese Patent Laid-open No. 2010-249727 measures the profile of a laser beam before it is focused, not the profile of a laser beam that has been focused which is to be applied to a workpiece. Since the laser beam is liable to vary while traveling on a beam path, the technology is unable to accurately acquire information about the laser beam that is actually applied to the workpiece. The technology disclosed in Japanese Patent Laid-open No. 2016-41437 measures the profile of a returning beam from a concave mirror that has reflected an oscillated laser beam. Consequently, the laser beam before it is focused and the returning beam to be measured overlap each other, so that the accuracy of the measured profile cannot be guaranteed.

It is therefore an object of the present invention to provide a laser beam profiler unit that is capable of accurately measuring the profile of a laser beam that has been focused which is to be applied to a workpiece, and a laser processing apparatus incorporating such a laser beam profiler unit.

In accordance with an aspect of the present invention, there is provided a laser beam profiler unit for measuring an intensity distribution of a laser beam oscillated from a laser oscillator incorporated in a laser processing apparatus, including a magnifying optical system for magnifying a spot diameter of the laser beam oscillated from the laser oscillator and focused by a condensing lens, a first transmission prism for attenuating the laser beam, a second transmission prism for further attenuating a laser beam reflected by the first transmission prism, an image capturing element for detecting the laser beam reflected by the second transmission prism, and an analyzer for analyzing an intensity distribution of a spot of the laser beam from data of the laser beam detected by the image capturing element.

With this arrangement, the focused laser beam is attenuated and magnified, and an image thereof is captured without returning the focused laser beam to a processing optical system, so that the laser beam profiler unit can accurately measure an intensity distribution and shape of a spot of the laser beam that is actually applied to a workpiece to be processed by the laser processing apparatus.

Preferably, the first transmission prism and the second transmission prism serve as paired transmission prisms, one of the paired transmission prisms attenuates P-polarized light of the laser beam at a higher attenuation rate, and the other of the paired transmission prisms attenuates S-polarized light of the laser beam at a higher attenuation rate, whereby the first transmission prism and the second transmission prism attenuate the P-polarized light and the S-polarized light equally. With this arrangement, the laser beam profiler unit can accurately measure an intensity distribution of a spot of the laser beam in which the P-polarized light and the S-polarized light are present.

Preferably, each of the first transmission prism and the second transmission prism includes a triangular prism having a bottom face in the shape of a rectangular equilateral triangle, and the laser beam is applied to a side face of the triangular prism which includes one of the two catheti or sides of the rectangular equilateral triangle. With this arrangement, since the laser beam is applied to the side face of the triangular prism which includes one of the two catheti of the rectangular equilateral triangle, consequently, even if part of the laser beam that is transmitted through the transmission prism is reflected within the transmission prism, the internally reflected beam does not meet the laser beam reflected by the side face. Therefore, no ghost is generated and only the reflected laser beam is accurately measured.

In accordance with another aspect of the present invention, there is provided a laser processing apparatus including a laser beam irradiation unit for applying a laser beam to a workpiece held on a chuck table, a control unit for controlling conditions under which the laser beam irradiation unit applies the laser beam, and a laser beam profiler unit for measuring an intensity distribution of a spot of the laser beam. The laser beam profiler unit includes a magnifying optical system for magnifying a spot diameter of a laser beam oscillated from a laser oscillator and focused by a condensing lens, a first transmission prism for attenuating the laser beam, a second transmission prism for further attenuating a laser beam reflected by the first transmission prism, a light detector for detecting a laser beam reflected by the second transmission prism, and an analyzer for analyzing an intensity distribution of a spot of the laser beam from data of the laser beam detected by the light detector.

In the above arrangement, the laser beam irradiation unit includes the laser oscillator for oscillating the laser beam, the condensing lens for focusing the laser beam, and the magnifying optical system for guiding the laser beam from the laser oscillator to the condensing lens, and the magnifying optical system shapes a spot shape of the laser beam.

According to the present invention, the focused laser beam is attenuated and magnified, and an image thereof is captured without returning the focused laser beam to a processing optical system, so that the laser beam profiler unit can accurately measure an intensity distribution and shape of a spot of the laser beam that is actually applied to a workpiece to be processed by the laser processing apparatus.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A preferred embodiment of the present invention will be described below with reference to the drawings. The present invention is not limited to the details of the illustrated preferred embodiment. The components described below cover those which could easily be envisaged by those skilled in the art and those which are essentially identical to those described below. Furthermore, the arrangements described below can be used in appropriate combinations. Various omissions, replacements, or changes of the arrangements may be made without departing from the scope of the present invention.

Figure 1:
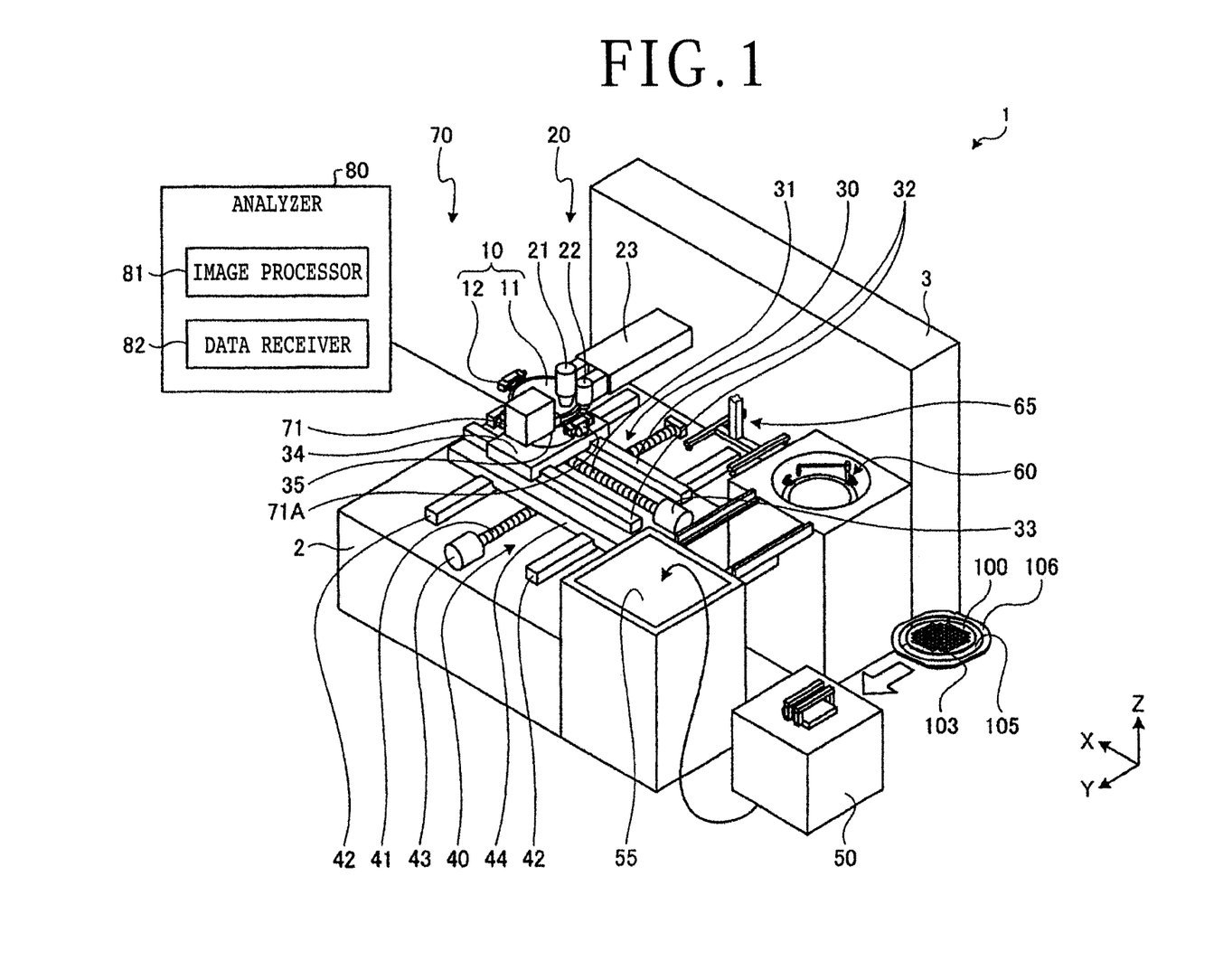
FIG. 1 is a perspective view of a laser processing apparatus according an embodiment of the present invention.

FIG. 1 depicts in perspective a laser processing apparatus 1 according to an embodiment of the present invention. As depicted in FIG. 1, the laser processing apparatus 1 includes a chuck table 10 disposed on an apparatus base 2 for holding a wafer 100 as a workpiece thereon and a laser irradiator (laser beam irradiation unit) 20 for applying a laser beam to the wafer 100. The wafer 100 is a plate-like object such as a disk-shaped semiconductor wafer made of silicon as a base material, an optical element wafer made of sapphire, SiC (silicon carbide), or the like as a base material, a packaged substrate with devices encapsulated in a synthetic resin thereon, a ceramics substrate, or the like. The wafer 100 has a face side demarcated by a grid of projected dicing lines thereon into a plurality of areas where devices 103 are formed. The wafer 100 is supported on an annular frame 106 by an adhesive tape 105 that is stuck to a reverse side of the wafer 100.

When the laser processing apparatus 1 is in operation, the laser irradiator 20 applies a laser beam to the wafer 100 held on the chuck table 10 along the projected dicing lines to form laser-processed grooves in the wafer 100. The laser irradiator 20 may apply a laser beam to the wafer 100 along the projected dicing lines to form modified layers in the wafer 100. The modified layers refer to regions where the density, refractive index, mechanical strength, and other physical properties are different from those of peripheral regions.

The laser processing apparatus 1 also includes an X-axis moving section (processing-feed mechanism) 30 for moving the chuck table 10 in an X-axis direction (processing feed direction) and a Y-axis moving section (indexing feed mechanism) 40 for moving the chuck table 10 in a Y-axis direction (indexing feed direction). The chuck table 10 and the laser irradiator 20 are thus able to move relatively in the X-axis direction and the Y-axis direction.

The laser processing apparatus 1 further includes a cassette rest 55 disposed adjacent to the apparatus base 2 for placing thereon a cassette 50 that houses a plurality of wafers 100 supported on respective annular frames 106, a spinner cleaner 60 disposed adjacent to the apparatus base 2 for cleaning a wafer 100 that has been processed by a laser beam, and a feeder 65 for delivering a wafer 100 to the chuck table 10, the spinner cleaner 60, and the cassette 50. The laser processing apparatus 1 also includes a profiler unit (a laser beam profiler unit or an intensity distribution measuring unit) 70 for measuring a profile such as a spot shape, an intensity distribution, or the like of a laser beam applied by the laser irradiator 20.

The chuck table 10 holds a wafer 100 thereon when the wafer 100 is processed by a laser beam. According to the present embodiment, the wafer 100 that is supported on the annular frame 106 by the adhesive tape 105 is held on the chuck table 10. The chuck table 10 has a holding surface 11 for holding the wafer 100 and the annular frame 106 under suction thereon and a plurality of clamps 12 disposed on an outer circumferential side of the holding surface 11 for securely placing the annular frame 106 on the holding surface 11.

The laser irradiator 20, which is fixed to an upstanding wall 3 of the apparatus base 2, applies a laser beam to the wafer 100 held on the chuck table 10. The laser irradiator 20 includes an irradiation head (beam condenser) 21 for applying a laser beam to the wafer 100, an image capturing section 22 disposed in side-by-side relation to the irradiation head 21 along the X-axis direction, and an irradiator body 23 projecting from the upstanding wall 3 and supporting the irradiation head 21 and the image capturing section 22 on a distal end thereof. The image capturing section 22 includes a camera for capturing an image of the wafer 100 placed on the chuck table 10 and an image of the wafer 100 that is being processed by a laser beam. According to the present embodiment, the image capturing section 22 may be a general camera or an infrared camera. Internal structural details of the irradiation head 21 and the irradiator body 23 will be described later.

The X-axis moving section 30 includes a ball screw 31 extending in the X-axis direction, a pair of guide rails 32 disposed one on each side of and extending parallel to the ball screw 31, a stepping motor 33 coupled to an end of the ball screw 31 for rotating the ball screw 31 about its own axis, and a slide plate 34 having a lower surface held in sliding contact with the guide rails 32 and having a nut, not depicted, therein that is threaded over the ball screw 31. When the stepping motor 33 is energized, the ball screw 31 is rotated about its own axis, causing the nut to move the slide plate 34 in the X-axis direction while the slide plate 34 is being guided by the guide rails 32. A rotary actuator 35 with a stepping motor, not depicted, housed therein is fixedly mounted on the slide plate 34. The rotary actuator 35 is coupled to the chuck table 10 and turns the chuck table 10 through a predetermined angle about its own axis. According to the present embodiment, based on an image captured of the wafer 100 by the image capturing section 22, the rotary actuator 35 turns the chuck table 10 and hence the wafer 100 so that the intersecting groups of projected dicing lines are oriented respectively in the X- and Y-axis directions.

The Y-axis moving section 40 includes a ball screw 41 extending in the Y-axis direction, a pair of guide rails 42 disposed one on each side of and extending parallel to the ball screw 41, a stepping motor 43 coupled to an end of the ball screw 41 for rotating the ball screw 41 about its own axis, and a slide plate 44 having a lower surface held in sliding contact with the guide rails 42 and having a nut, not depicted, therein that is threaded over the ball screw 41. The Y-axis moving section 40 is mounted on the apparatus base 2. When the stepping motor 43 is energized, the ball screw 41 is rotated about its own axis, causing the nut to move the slide plate 44 in the Y-axis direction while the slide plate 44 is being guided by the guide rails 42. The X-axis moving section 30 is disposed on the slide plate 44. Consequently, when the slide plate 44 moves in the Y-axis direction, the X-axis moving section 30 also moves in the Y-axis direction.

The cassette 50 houses a plurality of wafers 100 that are supported on respective annular frames 106 by respective adhesive tapes 105. The cassette rest 55 is vertically movable in Z-axis directions with respect to the apparatus base 2. The profiler unit 70 includes a unit body 71 for detecting a laser beam applied from the irradiation head 21 and an analyzer 80 for analyzing an intensity distribution of a laser beam that is detected by the unit body 71.

Figure 2:
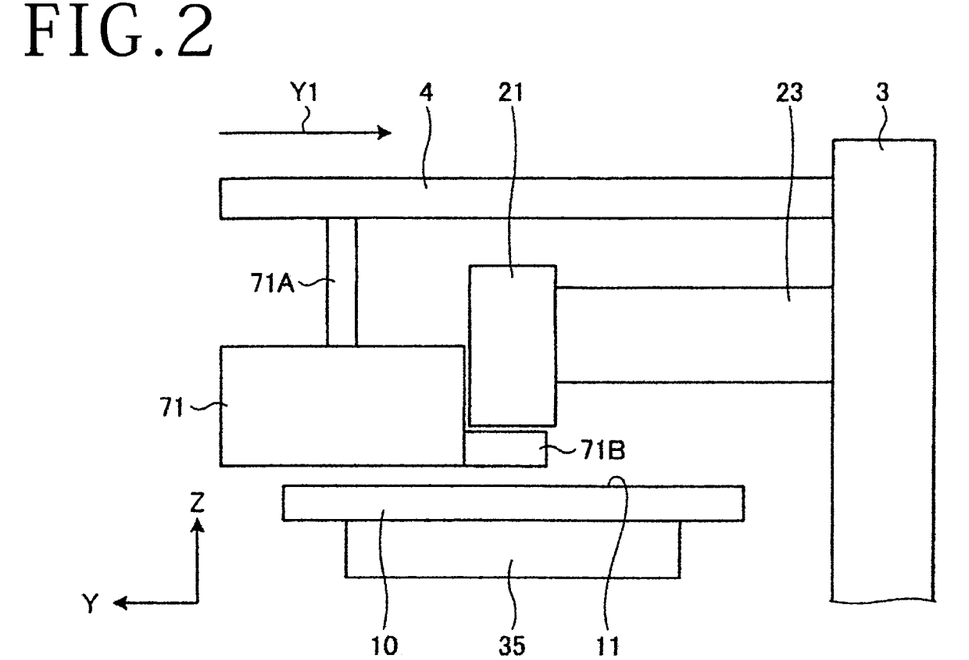
FIG. 2 is a schematic view depicting the manner in which a unit body of a laser beam profiler unit has moved to a measuring position below an irradiation head.
Figure 3:
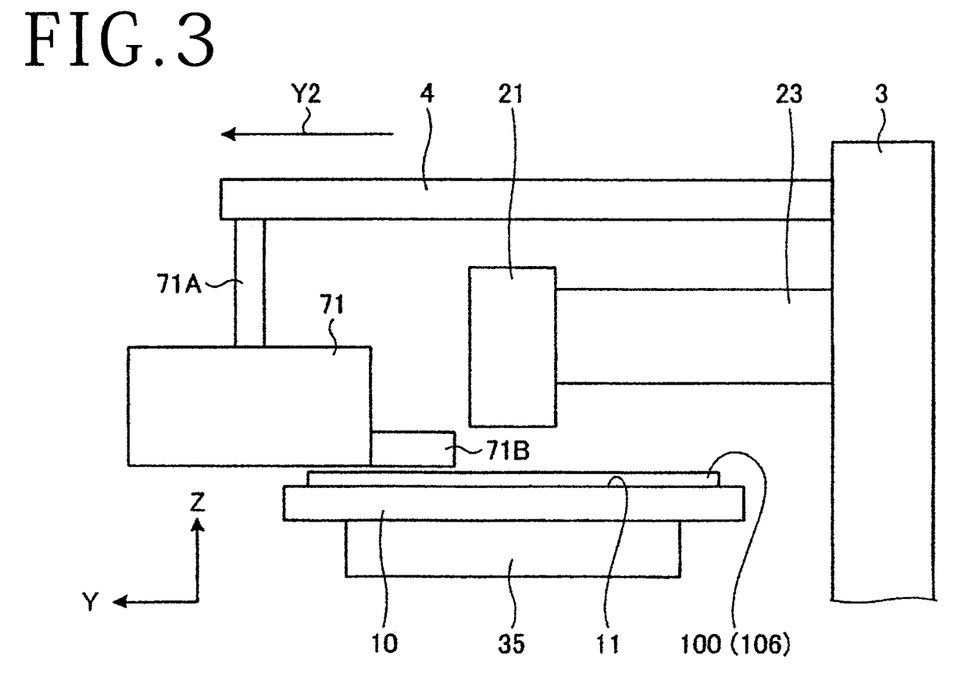
FIG. 3 is a schematic view depicting the manner in which the unit body has been retracted from the irradiation head to a retracted position.

The profiler unit 70 will be described in detail below. As depicted in FIGS. 2 and 3, the unit body 71 is suspended from a guide rail 4 that extends in the Y-axis direction from the upstanding wall 3 of the apparatus base 2. The unit body 71 has an upwardly extending support 71A coupled to a nut, not depicted, threaded over a ball screw, not depicted, housed in the guide rail 4. When the ball screw is rotated about its own axis by a motor, not depicted, the nut causes the support 71A and hence the unit body 71 to move along the guide rail 4. The unit body 71 also has a light detector 71B disposed below a surface thereof that faces the irradiation head 2 when the unit body 71 is in the position depicted in FIG. 2. When the unit body 71 is in the position depicted in FIG. 2, the light detector 71B can detect a laser beam applied from the irradiation head 21. For measuring a profile of the laser beam, the unit body 71 is moved in the direction indicated by the arrow Y1 along the guide rail 4, as depicted in FIG. 2, positioning the light detector 71B in a measuring position between the irradiation head 21 and the chuck table 10. For processing the wafer 100 on the chuck table 10 with the laser beam from the irradiation head 21, the unit body 71 is moved in the direction indicated by the arrow Y2 along the guide rail 4, as depicted in FIG. 3, retracting the light detector 71B away from the position beneath the irradiation head 21 to a retracted position. The unit body 71 of the profiler unit 70 may be moved by a reciprocating mechanism such as a cylinder, for example, rather than the linear-motion mechanism including the ball screw and the motor as described above. In the present embodiment, the mechanism for moving the unit body 71 is fixed to the upstanding wall 3 of the apparatus base 2. However, the mechanism for moving the unit body 71 is not limited to such a structure, but may be fixed to an upper surface of the apparatus base 2, for example.

Figure 5:
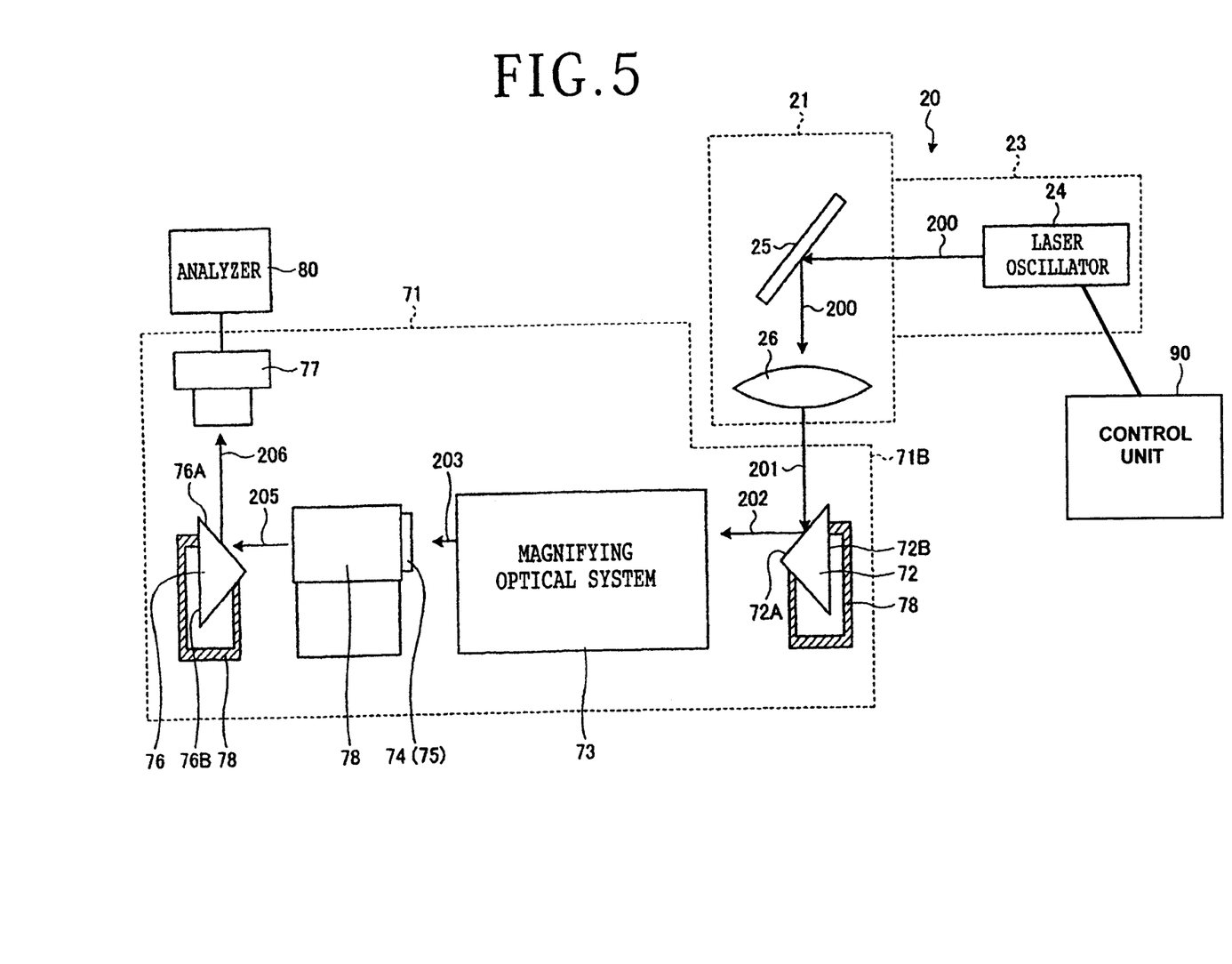
FIG. 5 is a side elevational view depicting internal structural details of the laser irradiator and the laser beam profiler unit.

As depicted in FIG. 5, the irradiator body 23 of the laser irradiator 20 houses therein a laser oscillator 24 for oscillating a laser beam 200 and an optical system, not depicted, for transmitting the oscillated laser beam 200. The laser oscillator 24 is controlled by a control unit 90 to adjust the wavelength (frequency), output power, and repetitive frequency of a laser beam to be oscillated thereby depending on the type of the wafer 100 and the way in which the wafer 100 is to be processed by the laser beam. The irradiation head 21 includes a total-reflection mirror 25 for reflecting the laser beam 200 oscillated by the laser oscillator 24 to travel in a downward direction and a condensing lens 26 for focusing the laser beam 200. The condensing lens 26, which serves as the optical system referred to above, includes a combination lens assembly including a plurality of convex and concave lenses, and emits a focused laser beam 201. The irradiation head 21 is capable of adjusting the focused position of the focused laser beam 201 in the Z-axis directions, i.e., vertical directions, through adjustments made by the optical system, i.e., the condensing lens 26, and of correcting the shape of the spot of the focused laser beam 201 into a desired shape such as an elliptical shape, a rectangular shape, or the like, with a cylindrical lens and a mask that are part of the optical system.

Figure 4:
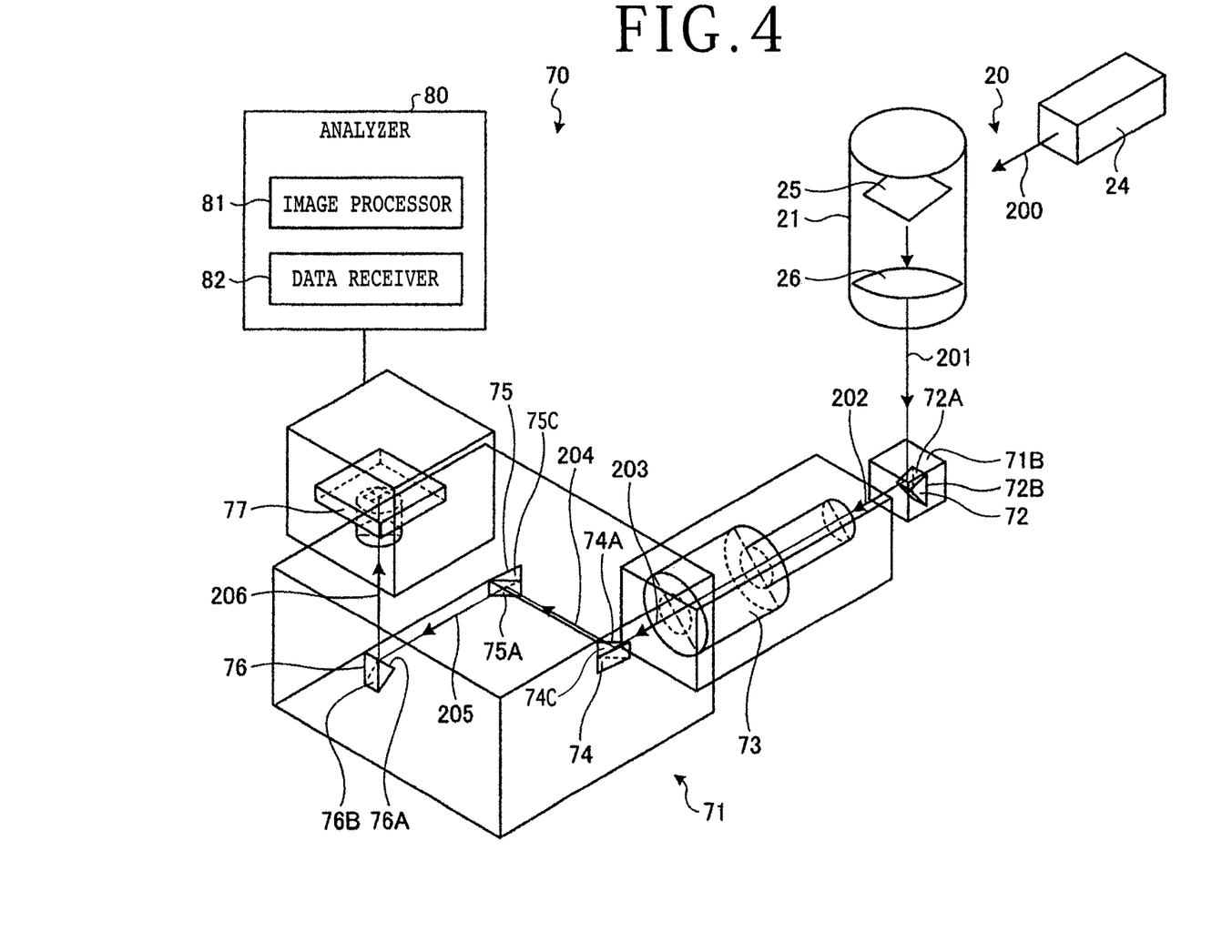
FIG. 4 is perspective view depicting internal structural details of a laser irradiator and the laser beam profiler unit.

As depicted in FIGS. 4 and 5, the unit body 71 includes four transmission prisms 72, 74, 75, and 76 for attenuating and transmitting the laser beam 201 applied from the irradiation head 21, an image capturing section 77 for detecting the transmitted laser beam 201, and a magnifying optical system 73 disposed between the transmission prism (first transmission prism) 72 and the transmission prism (second transmission prism) 74. The transmission prism 72 is disposed in the light detector 71B of the unit body 71.

As depicted in FIG. 4, the transmission prisms 72, 74, 75, and 76 includes a triangular prism each that has a bottom face in the shape of a rectangular equilateral triangle. The triangular prism has a side face 72A, 74A, 75A, and 76A which includes one of the two catheti or sides of the rectangular equilateral triangle and to which the laser beam 201 is applied. The transmission prisms 72, 74, 75, and 76 transmit most (e.g., 96%) of the laser beam applied thereto therethrough and reflect the remainder (approximately 2% through 4%) thereof, thereby attenuating the energy density of the laser beam to the extent that the image capturing section 77 can capture an image of the applied laser beam without being damaged thereby. According to the present embodiment, the transmission prisms 72, 74, 75, and 76 can attenuate the energy density of a laser beam 206 transmitted to the image capturing section 77 to approximately 1/400, 000 of the energy density of the laser beam 201 focused by the condensing lens 26.

Figure 6:
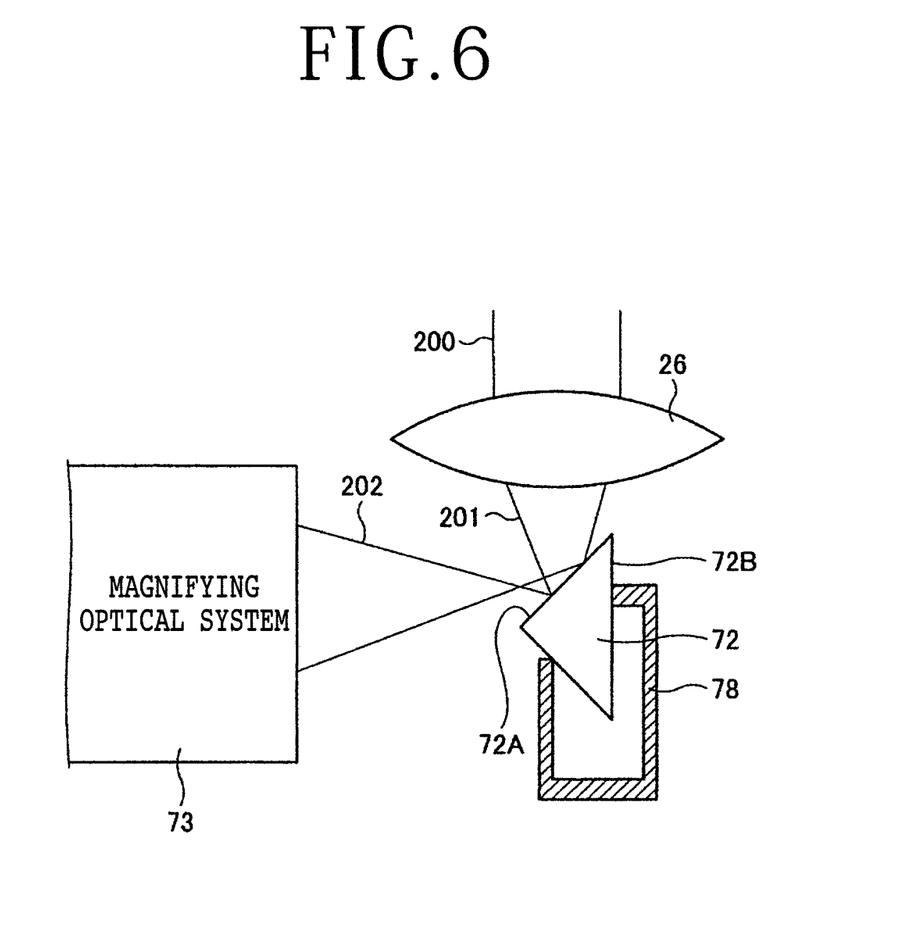
FIG. 6 is a view depicting the layout of a condensing lens, a transmission prism, and a magnifying optical system.

As depicted in FIGS. 5 and 6, the transmission prism 72 is held by a holder 78 such that a side face 72B thereof which includes the hypotenuse of the rectangular equilateral triangle extends vertically. The transmission prism 72 reflects the laser beam 201 applied vertically downwardly from the irradiation head 21 as a laser beam 202 in a horizontal direction from the side face 72A. The reflected laser beam 202 is converted by the magnifying optical system 73 into a laser beam 203 having an increased spot diameter, and the laser beam 203 is transmitted to the transmission prism 74. As depicted in FIGS. 4 and 5, the transmission prism 74 is held by a holder 78 such that an end face 74C thereof lies horizontally. The transmission prism 74 reflects the laser beam 203 at an angle of 90° as a laser beam 204 in a horizontal plane from the side face 74A. The reflected laser beam 204 is transmitted to the transmission prism 75.

According to the present embodiment, the transmission prism 72 and the transmission prism 74 act as paired transmission prisms for the following reasons. Generally, it is known that a laser beam contains S-polarized light and P-polarized light that are 90° out of phase with each other. Since the S-polarized light and the P-polarized light have different reflectivities, when they are reflected and transmitted by a plurality of transmission prisms, the S-polarized light and the P-polarized light are likely to be attenuated at different attenuation rates. According to the present embodiment, as the side face 72B of the transmission prism 72 extends vertically and the end face 74C of the transmission prism 74 extends horizontally, the transmission prism 72 attenuates one polarized light at a higher attenuation rate whereas the transmission prism 74 attenuates the other polarized light at a higher attenuation rate. Therefore, the transmission prism 72 and the transmission prism 74 that act as paired transmission prisms produce the laser beam 204 in which the S-polarized light and the P-polarized light have been equally attenuated in a well balanced manner.

Similarly, the transmission prism (second transmission prism) 75 and the transmission prism (first transmission prism) 76 also act as paired transmission prisms. As depicted in FIG. 4, the transmission prism 75 is held by a holder 78 (FIG. 5) such that an end face 75C thereof lies horizontally. The transmission prism 75 reflects the laser beam 204 at an angle of 90° as a laser beam 205 in a horizontal plane from the side face 75A. The reflected laser beam 205 is transmitted to the transmission prism 76. The transmission prism 76 is held by a holder 78 (FIG. 5) such that a side face 76B thereof which includes the hypotenuse of the rectangular equilateral triangle extends vertically. The transmission prism 76 reflects the laser beam 205 as the laser beam 206 vertically upwardly from the side surface 76A. The reflected laser beam 206 is transmitted to the image capturing section 77. The transmission prism 75 and the transmission prism 76 that act as paired transmission prisms produce the laser beam 206 in which the S-polarized light and the P-polarized light have been equally attenuated in a well balanced manner.

The image capturing section 77 has a photoelectric transducer for detecting the laser beam 206 and generating electric charges based on the detected laser beam 206, and may include a charge-coupled device (CCD), for example. The magnifying optical system 73 serves to increase the spot diameter of the laser beam applied thereto, and is constructed as an objective lens assembly including a plurality of convex and concave lenses. Since the magnifying optical system 73 transmits a laser beam having an increased spot diameter to the image capturing section 77 that captures an image of the spot of the laser beam, the image capturing section 77 can accurately measure the shape of the spot of the laser beam. According to the present embodiment, the magnifying optical system 73 is disposed between the transmission prism 72 and the transmission prism 74. However, the magnifying optical system 73 and the transmission prisms 72, 74, 75, and 76 are not limited to such a layout, but may be positionally switched around freely insofar as they are positioned between the irradiation head 21 and the laser irradiator 20 and the image capturing section 77.

As depicted in FIG. 4, the analyzer 80 includes an image processor 81 and a data receiver 82. The data receiver 82 receives an image captured by the image capturing section 77. An image captured by the image capturing section 77 represents an intensity distribution of the attenuated laser beam 206, and may have such a brightness distribution that it is the brightest at its center where the intensity is the highest and becomes progressively darker in a direction away from the center toward a peripheral edge thereof, for example. The image processor 81 converts grayscale levels of the captured image into finite-level discrete values. The analyzer 80 analyzes the intensity distribution, spot diameter, and spot shape of the laser beam 201 before it is attenuated, i.e., the laser beam 201 applied from the irradiation head 21, based on the intensity distribution of the laser beam 206 calculated from the converted discrete values.

According to the present embodiment, the transmission prisms 72, 74, 75, and 76 and the magnifying optical system 73 attenuate the laser beam 201 and increases its spot diameter, and the image capturing section 77 captures an image of the attenuated and magnified laser beam 206. Therefore, the profiler unit 70 can accurately measure the profile of the laser beam 201 that is actually applied to the wafer 100 without returning the laser beam 201 to a processing optical system.

The transmission prism 72 and the transmission prism 74 act as paired transmission prisms, and the transmission prism 72 attenuates one polarized light (S-polarized light) at a higher attenuation rate whereas the transmission prism 74 attenuates the other polarized light (P-polarized light) at a higher attenuation rate. Therefore, the transmission prism 72 and the transmission prism 74 produce the laser beam 204 in which the S-polarized light and the P-polarized light have been equally attenuated in a well balanced manner. The profiler unit 70 can thus accurately measure the intensity distribution of the spot of the laser beam 201 in which the P-polarized light and the S-polarized light are present.

The transmission prisms 72, 74, 75, and 76 include a triangular prism each that has a bottom face (end face) in the shape of a rectangular equilateral triangle, and the laser beam is applied to and reflected by the side face 72A, 74A, 75A, and 76A includes one of the two catheti or sides of a rectangular equilateral triangle. Consequently, even if part of the laser beam that is transmitted through the transmission prisms 72, 74, 75, and 76 is reflected within the transmission prisms 72, 74, 75, and 76, the internally reflected beam does not meet the laser beam reflected by the side face 72A, 74A, 75A, and 76A. Therefore, no ghost is generated and only the reflected laser beam is accurately measured.

Figure 8:
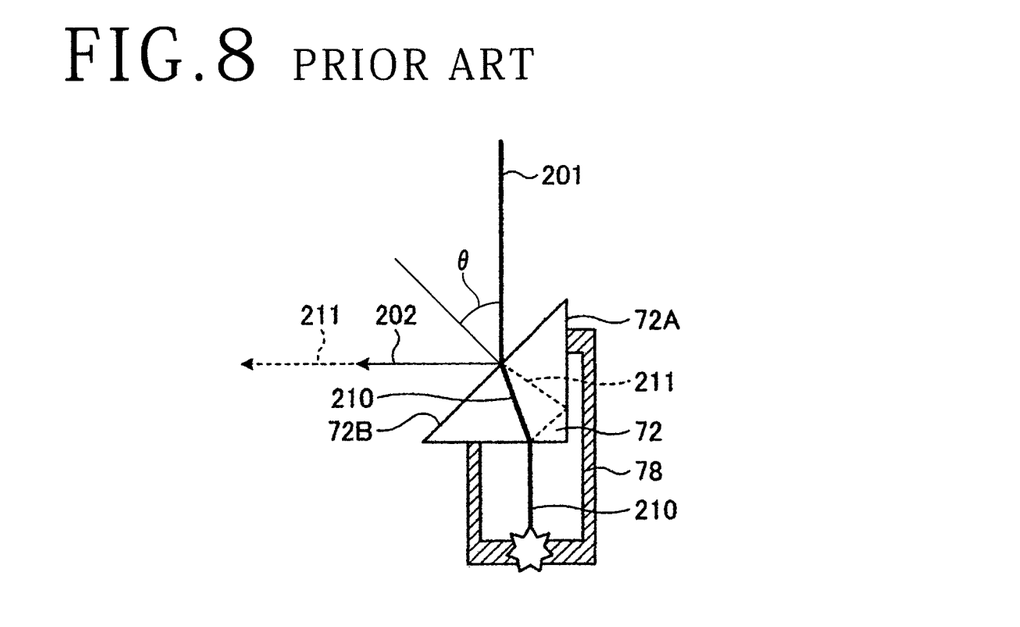
FIG. 8 is a view depicting the relationship between a reflected beam from a side face of a triangular transmission prism, which includes the hypotenuse of a rectangular equilateral triangle that represents the triangular transmission prism and to which an incident beam is applied, and an internal reflected beam in the triangular transmission prism.

According to the present embodiment, the transmission prisms 72, 74, 75, and 76 are oriented for accurate laser beam profile measurements. Generally, a transmission prism has such a tendency that a face thereof that has a large area is used as a face to which a laser beam is applied. In case of the transmission prism 72, the side face 72B thereof which includes the hypotenuse of the rectangular equilateral triangle tends to be used as a face to which a laser beam is applied, as depicted in FIG. 8. The transmission prism 72 is oriented such that the laser beam 201 is applied to the side face 72B at an incident angle θ of 45° in order for the side face 72B to reflect the laser beam 201 horizontally.

Part of a transmitted laser beam 210 that is transmitted through the transmission prism 72 may be reflected in the transmission prism 72 as an internally reflected beam 211, which may overlap the laser beam 202 reflected by the side face 72B, causing a ghost beam. If the internally reflected beam 211 overlaps the laser beam 202, it is impossible to accurately measure the profile of the transmitted laser beam 210.

Figure 7:
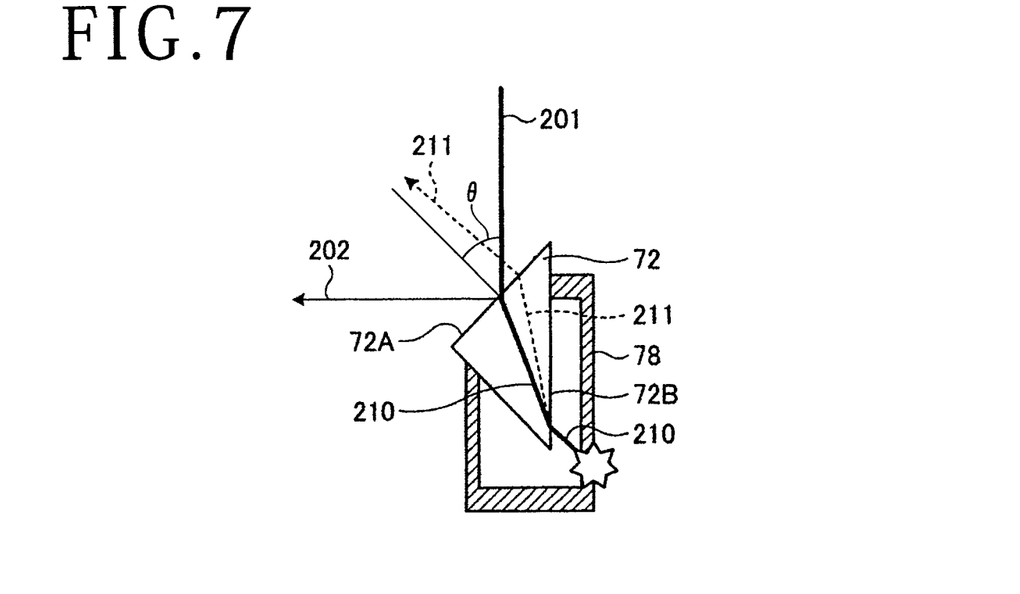
FIG. 7 is a view depicting the relationship between a reflected beam from a side face of a triangular transmission prism, which includes one of the two catheti of a rectangular equilateral triangle that represents the triangular transmission prism and to which an incident beam is applied, and an internal reflected beam in the triangular transmission prism.

According to the present embodiment, as depicted in FIG. 7, the transmission prism 72 has the side face 72A which includes one of the two catheti of the rectangular equilateral triangle as a face to which a laser beam is applied. The transmission prism 72 is oriented such that the laser beam 201 is applied to the side face 72A at an incident angle θ of 45° in order for the side face 72A to reflect the laser beam 201 horizontally. With the transmission prism 72 thus oriented, even if part of a transmitted laser beam 210 that is transmitted through the transmission prism 72 is reflected in the transmission prism 72 as an internally reflected beam 211, the internally reflected beam 211 is emitted from the transmission prism 72 in a different direction from the laser beam 202 reflected by the side face 72A. Since the internally reflected beam 211 does not overlap the laser beam 202, no ghost beam is generated. The other transmission prisms 74, 75, and 76 are also similarly oriented. Consequently, the profile of the laser beam 201 can accurately be measured based on the reflected laser beams 202, 204, 205, and 206.

The present invention is not limited to the above embodiment. Rather, various changes and modifications may be made in the embodiment without departing from the scope of the invention. For example, in the above embodiment, the paired transmission prisms 72 and 74, and the paired transmission prisms 75 and 76 are employed to attenuate the S-polarized light and the P-polarized light equally in a well balanced fashion. However, the number of pairs of transmission prisms can be changed insofar as the laser beam transmitted to the image capturing section 77 has been attenuated to a desired attenuation rate.

The present invention is not limited to the above described preferred embodiment. The scope of the invention is defined by the appended claims and all changes and modifications as fall within the equivalence of the scope of the claims are therefore to be embraced by the invention.

What is claimed is:

1. A laser beam profiler unit for measuring an intensity distribution of a laser beam oscillated from a laser oscillator incorporated in a laser processing apparatus, comprising:
   a magnifying optical system for magnifying a spot diameter of the laser beam oscillated from the laser oscillator and focused by a condensing lens;
   a first transmission prism for attenuating the laser beam;
   a second transmission prism for further attenuating a laser beam reflected by the first transmission prism;
   an image capturing element for detecting the laser beam reflected by the second transmission prism; and
   an analyzer for analyzing an intensity distribution of a spot of the laser beam from data of the laser beam detected by the image capturing element.

2. A laser beam profiler unit for measuring an intensity distribution of a laser beam oscillated from a laser oscillator incorporated in a laser processing apparatus, comprising:
   a magnifying optical system for magnifying a spot diameter of the laser beam oscillated from the laser oscillator and focused by a condensing lens;
   a first transmission prism for attenuating the laser beam;
   a second transmission prism for further attenuating a laser beam reflected by the first transmission prism;
   an image capturing element for detecting the laser beam reflected by the second transmission prism; and
   an analyzer for analyzing an intensity distribution of a spot of the laser beam from data of the laser beam detected by the image capturing element;
   wherein the first transmission prism and the second transmission prism serve as paired transmission prisms, one of the paired transmission prisms attenuates P-polarized light of the laser beam at a higher attenuation rate, and the other of the paired transmission prisms attenuates S-polarized light of the laser beam at a higher attenuation rate, whereby the first transmission prism and the second transmission prism attenuate the P-polarized light and the S-polarized light equally.

3. The laser beam profiler unit according to claim 1, wherein each of the first transmission prism and the second transmission prism comprises a triangular prism having a bottom face corresponding to the hypotenuse of a triangle, and the laser beam is applied to a side face of the triangular prism which includes one of the two catheti of the triangle.

4. A laser processing apparatus comprising:
   a laser beam irradiation unit for applying a laser beam to a workpiece held on a chuck table;
   a control unit for controlling conditions under which the laser beam irradiation unit applies the laser beam; and
   a laser beam profiler unit for measuring an intensity distribution of a spot of the laser beam; wherein
   the laser beam profiler unit includes;
      a magnifying optical system for magnifying a spot diameter of the laser beam oscillated from a laser oscillator and focused by a condensing lens;
      a first transmission prism for attenuating the laser beam;
      a second transmission prism for further attenuating a laser beam reflected by the first transmission prism;
      a light detector for detecting the laser beam reflected by the second transmission prism; and
      an analyzer for analyzing an intensity distribution of a spot of the laser beam from data of the laser beam detected by the light detector.

5. The laser processing apparatus according to claim 4, wherein the laser beam irradiation unit includes the laser oscillator for oscillating the laser beam, the condensing lens for focusing the laser beam, and the magnifying optical system for guiding the laser beam from the laser oscillator to the condensing lens, and
   the magnifying optical system shapes a spot shape of the laser beam.

6. The laser beam profiler unit according to claim 1, wherein the first transmission prism and the second transmission prism serve as paired transmission prisms, whereby the first transmission prism and the second transmission prism attenuate differently polarized light equally.

7. The laser beam profiler unit according to claim 1, wherein the magnifying optical system is disposed before the first transmission prism.

8. The laser processing apparatus according to claim 4, wherein the magnifying optical system is disposed before the first transmission prism.

9. The laser beam profiler unit according to claim 1, further comprising:
   a third transmission prism for further attenuating a laser beam reflected by the second transmission prism; and
   a fourth transmission prism for further attenuating a laser beam reflected by the third transmission prism.

10. The laser beam profiler unit according to claim 2, further comprising:
    at least one of an additional pair of transmission prisms, wherein each pair of transmission prisms attenuates the P-polarized light and the S-polarized light equally.

11. The laser processing apparatus according to claim 4, wherein the first transmission prism and the second transmission prism serve as paired transmission prisms, whereby the first transmission prism and the second transmission prism attenuate differently polarized light equally.

12. The laser beam profiler unit according to claim 1, wherein the first and second transmission prisms only reflect approximately 2 to 4% of the laser beam applied thereto.

13. The laser processing apparatus according to claim 4, wherein the first and second transmission prisms only reflect approximately 2 to 4% of the laser beam applied thereto.

14. The laser beam profiler unit according to claim 1, wherein the first and second transmission prisms attenuate the laser beam to at least 1/400,000 of the energy density of the laser beam oscillated from the laser oscillator and focused by the condensing lens.

15. The laser processing apparatus according to claim 4, wherein the first and second transmission prisms attenuate the laser beam to at least 1/400,000 of the energy density of the laser beam oscillated from the laser oscillator and focused by the condensing lens.

16. The laser beam profiler unit according to claim 1, wherein each of the first and second transmission prisms reflect the laser beam at an angle of 90°.

17. The laser processing apparatus according to claim 4, wherein each of the first and second transmission prisms reflect the laser beam at an angle of 90°.

* * * * *